United States Patent
Yin (10) Patent No.: US 9,894,521 B2
(45) Date of Patent: Feb. 13, 2018

(54) IDENTIFYING TRAFFIC ASSOCIATED WITH A CONTENT PROVIDER'S TOLL-FREE DATA SERVICE CAMPAIGN

(71) Applicant: Verizon Patent and Licensing Inc., Arlington, VA (US)

(72) Inventor: Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 14/995,877

(22) Filed: Jan. 14, 2016

(65) Prior Publication Data

US 2017/0208461 A1 Jul. 20, 2017

(51) Int. Cl.
*H04L 29/06* (2006.01)
*H04W 12/06* (2009.01)
*H04M 15/08* (2006.01)
*H04W 12/02* (2009.01)

(52) U.S. Cl.
CPC ......... *H04W 12/06* (2013.01); *H04L 63/0478* (2013.01); *H04L 63/0892* (2013.01); *H04M 15/08* (2013.01); *H04W 12/02* (2013.01)

(58) Field of Classification Search
CPC .................................................. H04L 63/0478
USPC ........................................................ 713/168
See application file for complete search history.

(56) References Cited

U.S. PATENT DOCUMENTS 6,535,855 B1 * 3/2003 Cahill .................... G06Q 20/00
340/540

OTHER PUBLICATIONS

Wikipedia, "Content delivery network," https://en.wikipedia.org/wiki/Content_delivery_network, Nov. 12, 2015, 7 pages.
Wikipedia, "Public-key cryptography," https://en.wikipedia.org/wiki/Public-key_cryptography, Dec. 3, 2015, 13 pages.

* cited by examiner

*Primary Examiner* — Longbit Chai (57) ABSTRACT

A device may receive, from a mobile device, first encrypted information, encrypted by a content provider device using a first private key, and at least one unencrypted identifier. The device may decrypt, using a first public key, the first encrypted information to obtain first information that may include second encrypted information, encrypted using a second public key. The device may decrypt, using a second private key, the second encrypted information to obtain second information that may include at least one first identifier and at least one second identifier corresponding to a toll-free data service campaign that may be provided by a content provider. The device may allow toll-free data service traffic, for the mobile device, based on whether the at least one first identifier corresponds to the at least one unencrypted identifier and the traffic includes at least one third identifier that corresponds to the at least one second identifier.

20 Claims, 7 Drawing Sheets

FIG. 4A US 9,894,521 B2

IDENTIFYING TRAFFIC ASSOCIATED WITH A CONTENT PROVIDER'S TOLL-FREE DATA SERVICE CAMPAIGN

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a content provider that provides the toll-free data service, rather than to an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a content provider (e.g., a third party) that provides the toll-free data service, rather than to an end user who uses a mobile device to access the toll-free data service. A content provider may set up a toll-free data service campaign that describes parameters of a toll-free data service, such as a total amount of data (e.g., a maximum amount) that may be charged to the content provider in association with the toll-free data service. In some implementations, multiple toll-free data service campaigns may generate traffic from the same internet protocol (IP) address and/or the same port, despite being provided by different content providers. Implementations described herein may assist with identifying traffic (e.g., traffic associated with a content provider's toll-free data service campaign), for which the associated data usage will be charged to a particular content provider, and differentiating toll-free data service campaigns having content delivered, by different content providers, through the same IP address and/or from the same port.

Figure 1A:
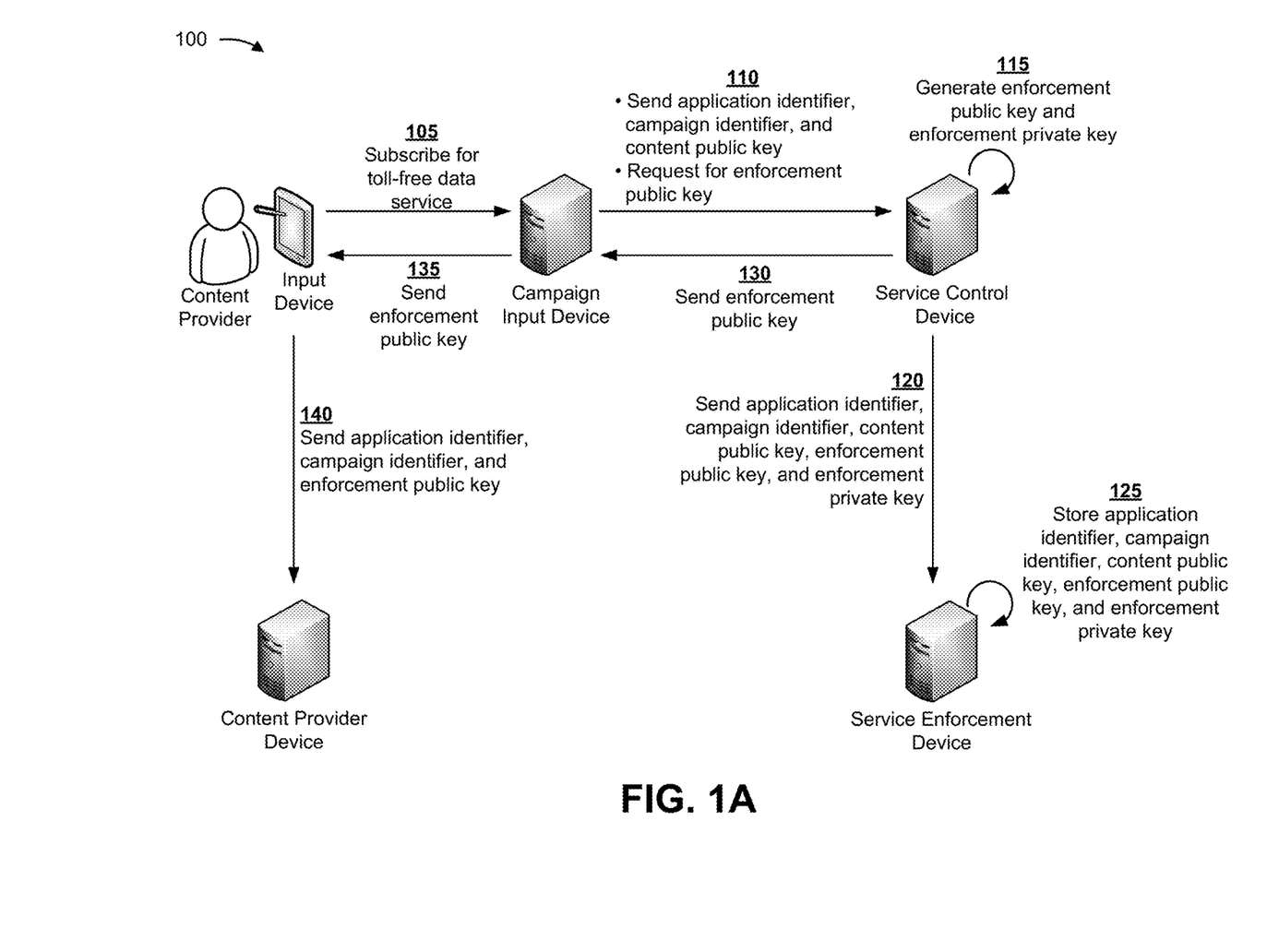
FIGS. 1A-1C are diagrams of an overview of an example implementation described herein.
Figure 1B:
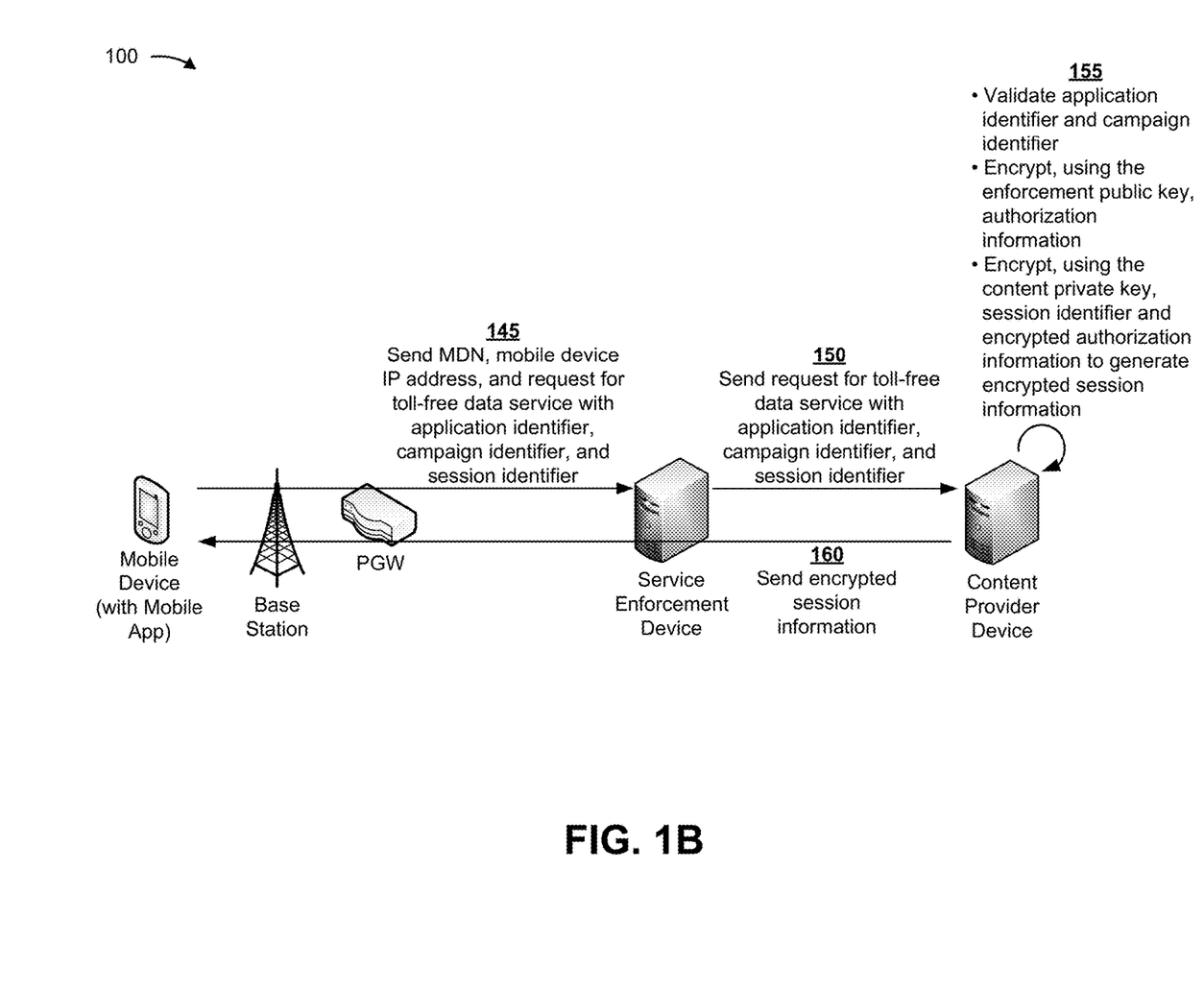
Figure 1C:
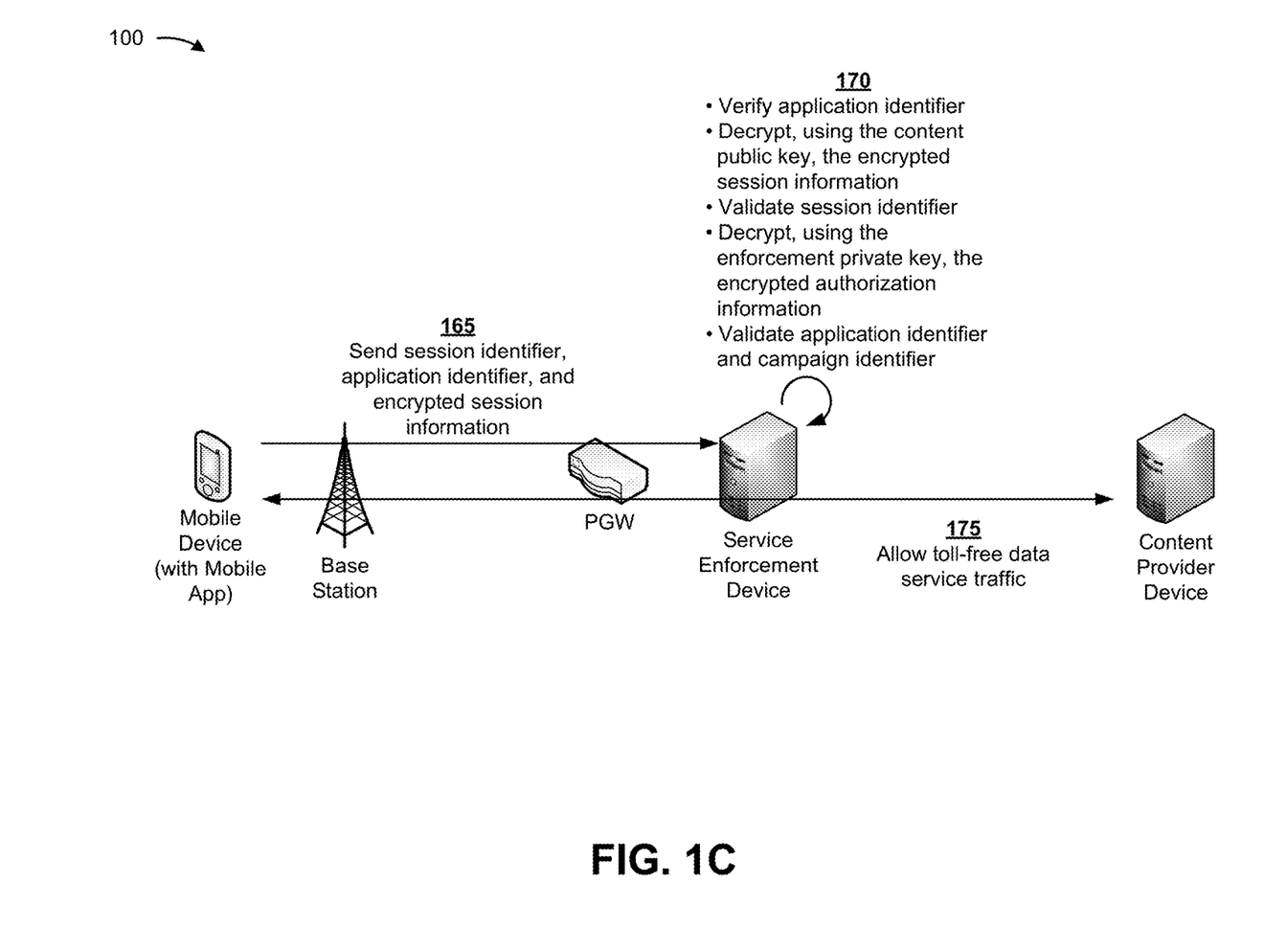

FIGS. 1A-1C are diagrams of an overview of an example implementation 100 described herein. As shown in FIG. 1A, assume that a content provider (e.g., a third party) may desire to establish a toll-free data service campaign (e.g., to promote the content providers services). Further assume that the content provider may have or be associated with an application (e.g., an app or a mobile app), and that users may use the application on their devices (e.g., mobile devices) to send and/or receive traffic under the content provider's toll-free data service campaign.

As shown by reference number 105, the content provider may use a suitable input device to subscribe for toll-free data service by way of a campaign input device. As shown by reference number 110, the campaign input device may send, to a service control device, an application identifier, a campaign identifier, a content public key (e.g., received from the content provider), and a request for an enforcement public key. As shown by reference number 115, the service control device may generate the enforcement public key, along with a corresponding enforcement private key. As shown by reference number 120, the service control device may send, to a service enforcement device, the application identifier, the campaign identifier, the content public key, the enforcement public key, and the enforcement private key. As shown by reference number 125, the service enforcement device may store the application identifier, the campaign identifier, the content public key, the enforcement public key, and the enforcement private key. The service control device may send, to the campaign input device, the enforcement public key, as shown by reference number 130, and the campaign input device may send the enforcement public key to the input device, as shown by reference number 135. As shown by reference number 140, the content provider and/or the input device may send the application identifier, the campaign identifier, and the enforcement public key for storage by a content provider device, where the content public key and content private key may already be stored.

As shown in FIG. 1B and by reference number 145, a mobile device (with a mobile app) may send, to a service enforcement device, a mobile device number (MDN), a mobile device IP address, and a request for toll-free data service with an application identifier, a campaign identifier, and a session identifier (SID). The service enforcement device may send the request for toll-free data service, with the application identifier, the campaign identifier, and the session identifier, to the content provider device, as shown by reference number 150. As shown by reference number 155, the content provider device may: validate the application identifier and the campaign identifier, use the enforcement public key to encrypt authorization information to generate encrypted authorization information, and use the content private key to encrypt the session identifier and encrypted authorization information to generate encrypted session information. As shown by reference number 160, the content provider device may send (e.g., via the service enforcement device) the encrypted session information to the mobile device.

As shown in FIG. 1C and by reference number 165, the mobile device may send the session identifier, the application identifier, and the encrypted session information to the service enforcement device. As shown by reference number 170, the service enforcement device may: verify the application identifier received from the mobile device, use the content public key to decrypt the encrypted session information, validate the session identifier received from the mobile device (e.g., based on the decrypted session information), use the enforcement private key to decrypt the encrypted authorization information, and validate the application identifier and the campaign identifier (e.g., based on the decrypted authorization information). As shown by reference number 175, the service enforcement device may allow toll-free data service traffic, as requested by the mobile device.

In this way, content providers may designate traffic as being part of the content provider's toll-free data service campaign, even where traffic associated with multiple toll-free data service campaigns is delivered through the same IP address and/or from the same port. Enabling a content provider to designate traffic as being part of the content provider's toll-free data service campaign may allow a network operator to identify traffic as being associated with the content provider's toll-free data service campaign. Thus, implementations described herein may permit a network operator to charge data usage to a particular toll-free data service campaign, even where traffic associated with multiple toll-free data service campaigns is delivered through the same IP address and/or from the same port. In some implementations, multiple validations may reduce delays related to toll-free data service processing and may reduce traffic load imposed on the network by traffic rules because a traffic flow may not be established for all sessions.

As indicated above, FIGS. 1A-1C are provided merely as an example. Other examples are possible and may differ from what was described with regard to FIGS. 1A-1C.

Figure 2:
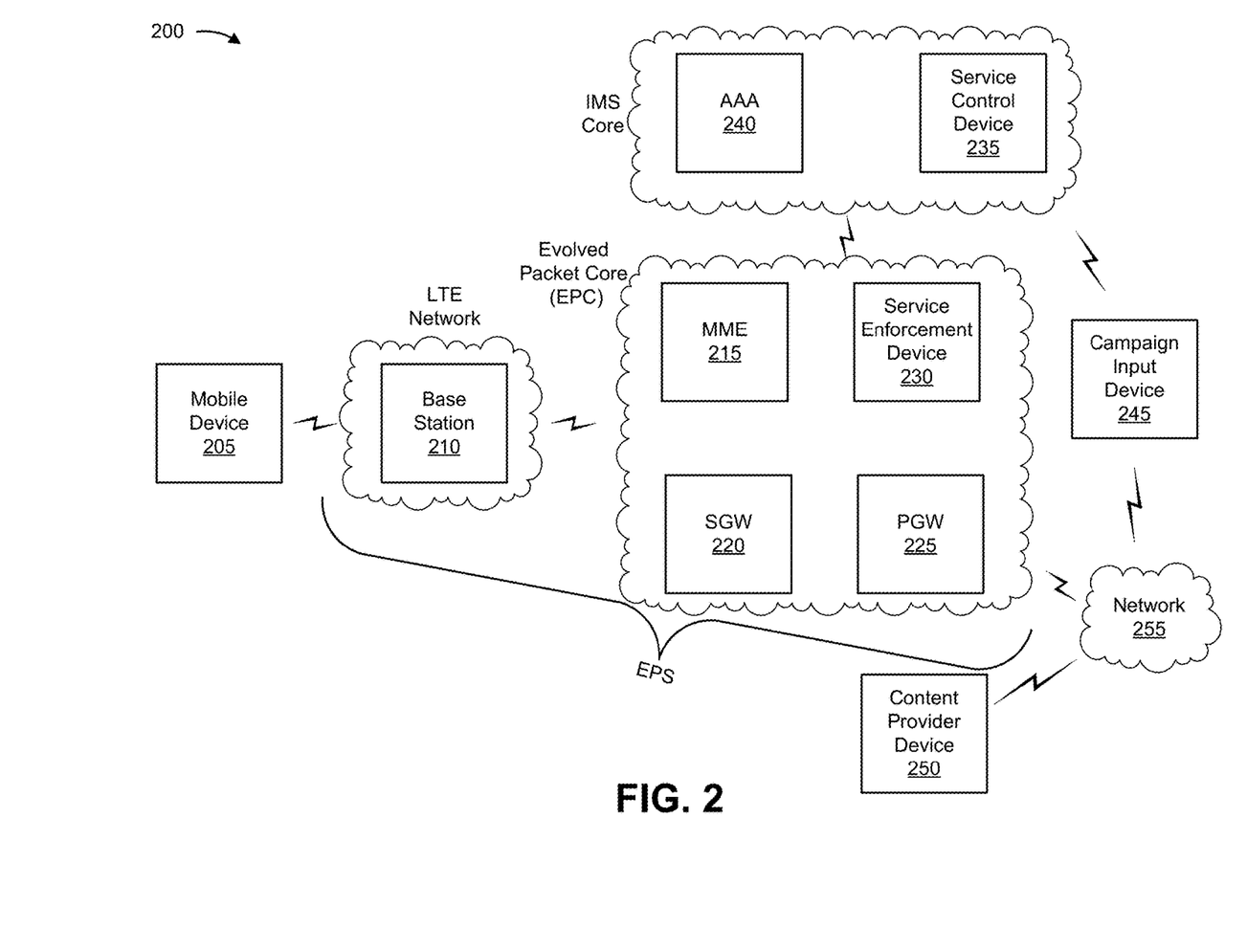
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a service enforcement device 230; a service control device 235; an authentication, authorization, and accounting server (AAA) 240; a campaign input device 245; a content provider device 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and/or service enforcement device 230 that enable mobile devices 205 to communicate with network 255 and/or an Internet protocol (IP) multimedia subsystem (IMS) core. The IMS core may include service control device 235 and/or AAA 240, and may manage device registration and authentication, session initiation, campaign information, etc., associated with mobile devices 205 and/or content provider devices 250. Service control device 235 and/or AAA 240 may reside in the EPC and/or the IMS core.

Mobile device 205 may include one or more devices capable of communicating with base station 210 and/or a network (e.g., network 255). For example, mobile device 205 may include a wireless communication device, a radio-telephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses, a smart watch, etc.), a machine device, and/or a similar device. Mobile device 205 may send traffic to and/or receive traffic from network 255 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a radio access network that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to mobile device 205 via SGW 220 and base station 210. PGW 225 may record data usage information (e.g., byte usage), and may provide the data usage information to AAA 240.

Service enforcement device 230 may include one or more devices capable of inspecting traffic and applying one or more toll-free data service campaign rules to the traffic. For example, service enforcement device 230 may include a gateway, a router, a modem, a switch, a firewall, a NIC, a hub, a bridge, a server, an OADM, or a similar device.

Service enforcement device 230 may receive campaign rules from service control device 235, may apply the campaign rules to traffic received from PGW 225, and may instruct PGW 225 how to handle the traffic based on the campaign rules. Additionally, or alternatively, service enforcement device 230 may instruct AAA 240 how to charge for data usage associated with the traffic. Different service enforcement devices 230 may be associated with different geographic regions and/or cellular service areas, in some implementations. In some implementations, service enforcement device 230 may be used for toll-free data service traffic detection, byte counting, and traffic modification. For example, toll-free data service traffic (e.g., packets) may be routed from content provider device 250 to mobile device 205, via network 255, PGW 225, service enforcement device 230, PGW 225, SGW 220, and base station 210. In some implementations, toll-free data service traffic (e.g., packets) may be routed from mobile device 205 to content provider device 250, via base station 210, SGW 220, PGW 225, service enforcement device 230, PGW 225, and network 255.

Service control device 235 may include one or more devices capable of receiving, generating, storing, processing, and/or providing information associated with a toll-free data service campaign (e.g., campaign information, campaign rules, etc.). For example, service control device 235 may include a server device or a similar device. Service control device 235 may receive campaign information from campaign input device 245, may generate campaign rules based on the campaign information, and may deploy the campaign rules to one or more service enforcement devices 230 (e.g., associated with one or more cellular service areas).

AAA 240 may include one or more devices, such as one or more server devices, that perform authentication, authorization, and/or accounting operations for communication sessions associated with mobile device 205. For example, AAA 240 may store data usage information for mobile device 205, for a user associated with mobile device 205, for content provider device 250, for a content provider (e.g., that provides a toll-free data service), etc.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server device, or a similar device. Campaign input device 245 may receive input, from a content provider, that identifies campaign information, and may provide the campaign information to service control device 235.

Content provider device 250 may include one or more devices capable of providing content (e.g., to mobile device 205). For example, content provider device 250 may include a server device (e.g., a host server, a web server, an application server, etc.) or a similar device. Content provider device 250 may be associated with a content provider that provides a toll-free data service, where the content provider is charged for data usage rather than an end user associated with mobile device 205.

Network 255 may include one or more wired and/or wireless networks. For example, network 255 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
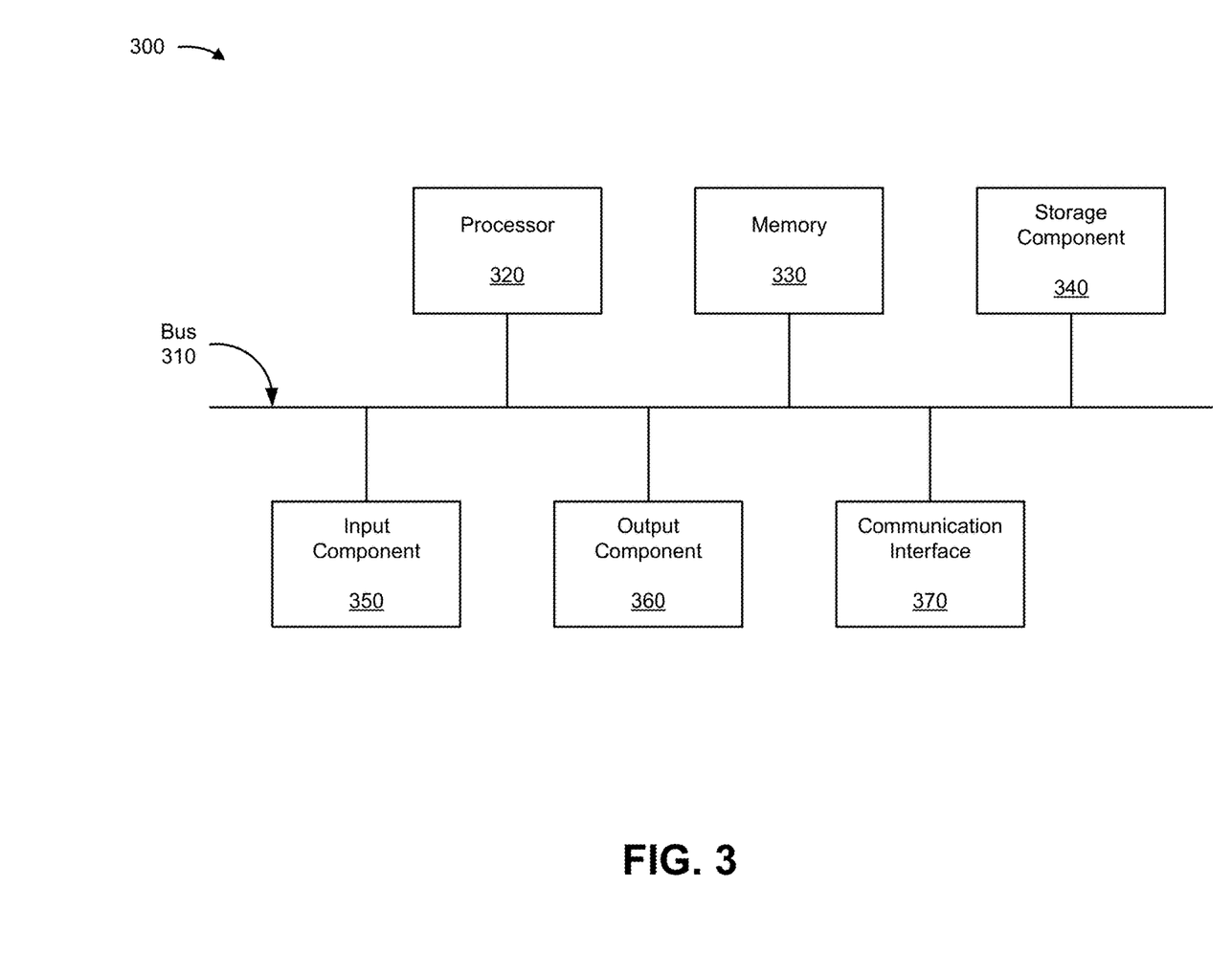
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, service enforcement device 230, service control device 235, AAA 240, campaign input device 245, and/or content provider device 250. In some implementations, mobile device 205, base station 210, MME 215, SGW 220, PGW 225, service enforcement device 230, service control device 235, AAA 240, campaign input device 245, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
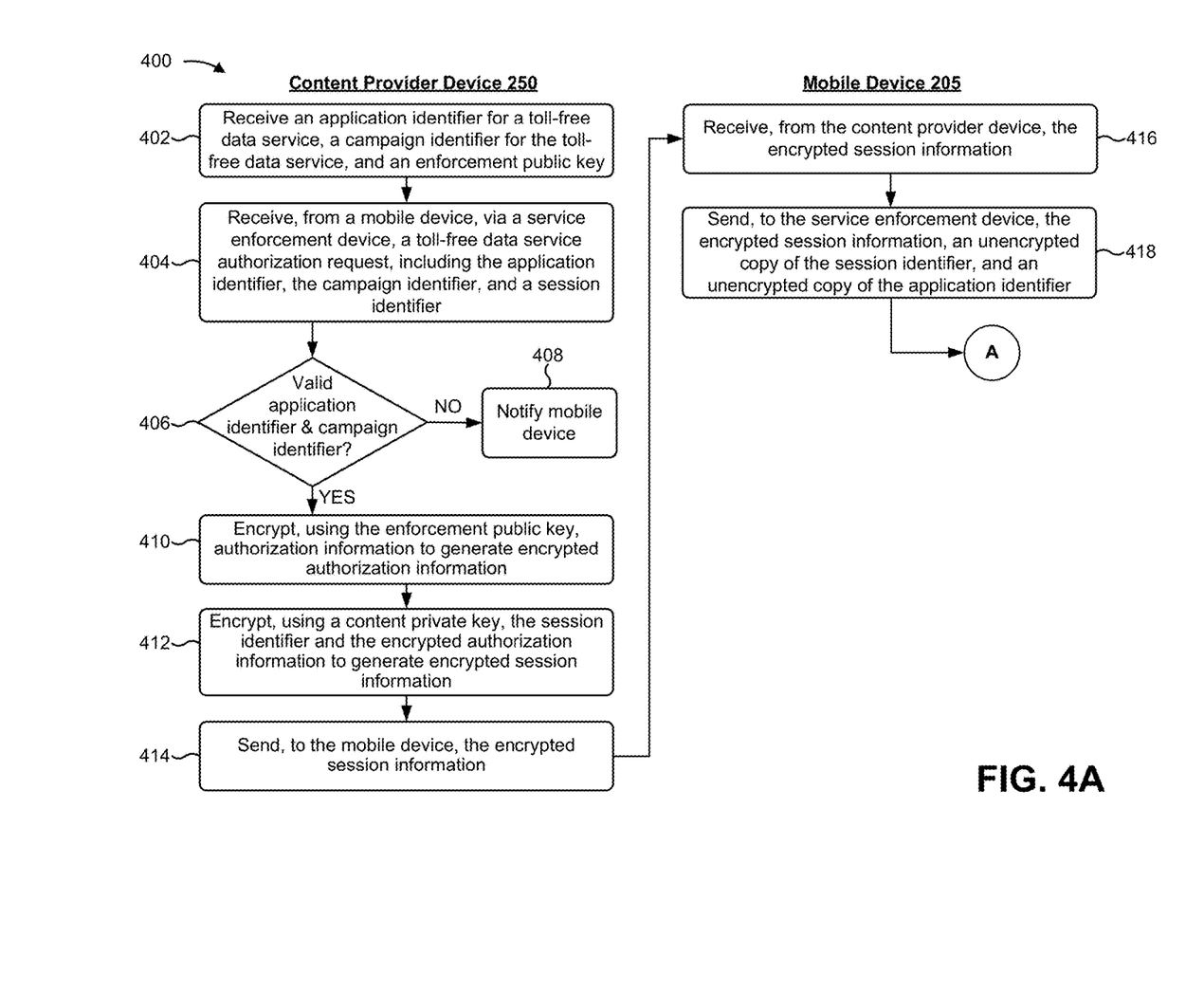
FIGS. 4A and 4B are flow charts of an example process for identifying traffic associated with a content provider's toll-free data service campaign.
Figure 4B:
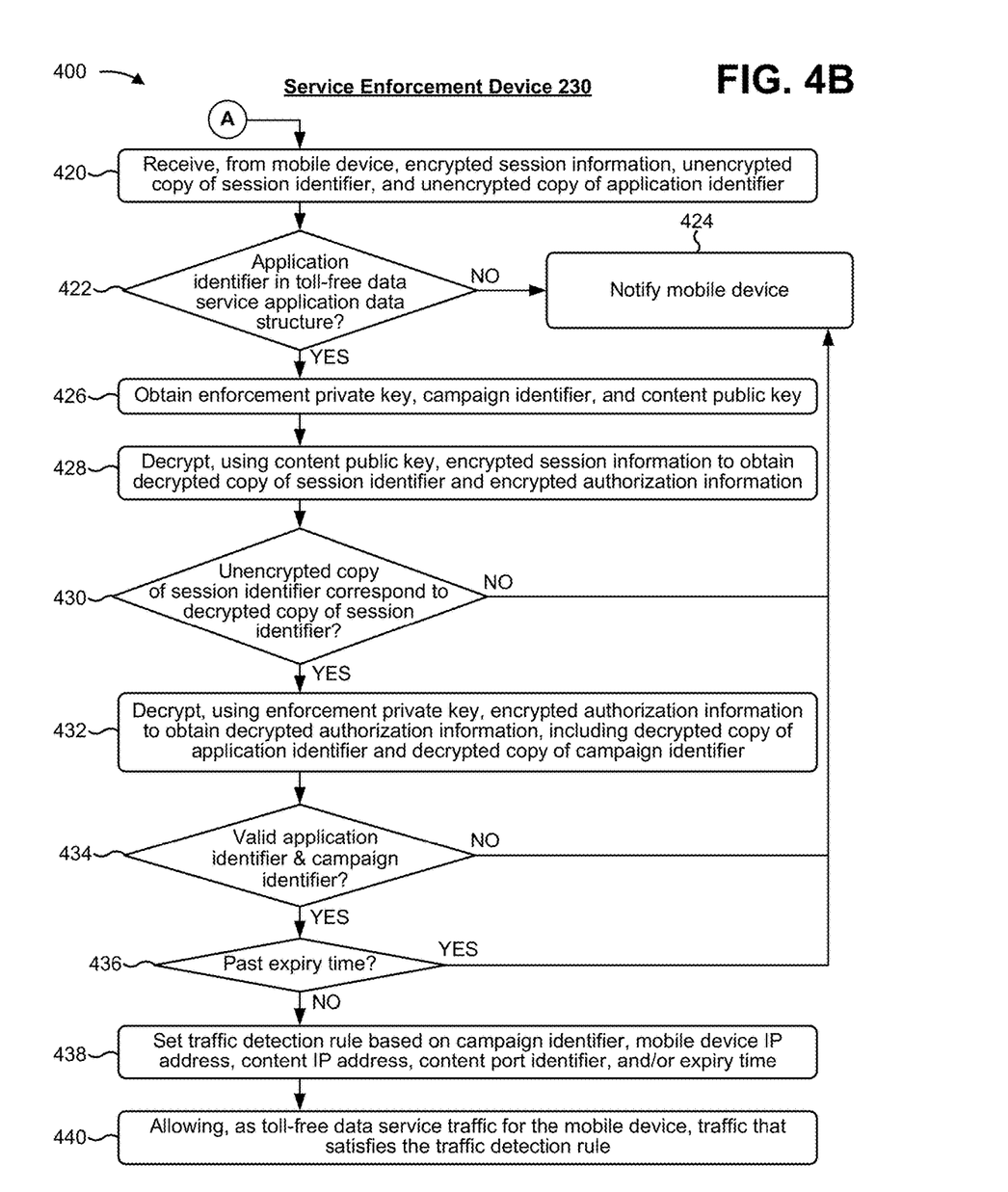

FIGS. 4A and 4B are flow charts of an example process 400 for identifying traffic associated with a content provider's toll-free data service campaign. In some implementations, one or more process blocks of FIGS. 4A and 4B may be performed by mobile device 205, service enforcement device 230, and/or content provider device 250. In some implementations, one or more process blocks of FIGS. 4A and 4B may be performed by another device or a group of devices separate from or including mobile device 205, service enforcement device 230, and/or content provider device 250, such as base station 210, MME 215, SGW 220, PGW 225, service control device 235, AAA 240, and campaign input device 245.

As shown in FIG. 4A, process 400 may include receiving an application identifier for a toll-free data service, a campaign identifier for the toll-free data service, and an enforcement public key (block 402). For example, content provider device 250 may receive an application identifier associated with a toll-free data service, a campaign identifier for the toll-free data service, and an enforcement public key.

A toll-free data service may include a service, provided by a content provider, where the content provider agrees to be charged for data usage by users of mobile devices 205 that access content provided by the content provider (e.g., rather than the users being charged for the data usage). For example, a toll-free data service may include a web browsing service, an online shopping service, an audio service (e.g., a radio service, a music service, etc.), a video service (e.g., a movie service), a gaming service, a social networking service, a file-sharing service, a content-providing service, or the like. A toll-free data service offer may include an offer for a toll-free data service (e.g., an offer that provides access to a toll-free data service, such as via a link, an application, a website, etc.).

In some implementations, the content provider may create a toll-free data service using campaign input device 245 (e.g., through a self-service onboarding portal accessed by way of a suitable input device, such as a computer, tablet, mobile device, etc.). For example, the content provider may use campaign input device 245 to sign up an account, log in to the account, subscribe for a toll-free data service (e.g., from the network operator), and/or create a toll-free data service campaign. In some implementations, campaign input device 245 may create an application identifier for the toll-free data service and a campaign identifier for the toll-free data service campaign.

In some implementations, the application identifier for the toll-free data service may be associated with a toll-free data service application (e.g., an app or a mobile app) that content provider may provide, and that users may use (e.g., on mobile device 205), to send and/or receive traffic under the content provider's toll-free data service campaign. In some implementations, a user may register to receive toll-free data service offers using the toll-free data service application. For example, a user may interact with mobile device 205 to download the toll-free data service application and may interact with the toll-free data service application to register to receive toll-free data services and/or toll-free data service offers.

In some implementations, the campaign identifier may identify a particular toll-free data service campaign that is being set-up and/or provided by a content provider. For example, a content provider may create a toll-free data service campaign identified by the campaign identifier and set a quota and valid time range (from/to, one or more days of the week, one or more hours of the day, etc.) for the content provider's toll-free data service campaign.

In some implementations, the content provider and the network operator may exchange public key certificates. For example, the content provider may already have its own public and private key pair (e.g., a public key certificate and a corresponding private key certificate). The content provider's public and private key pair may be a first public and private key pair, that includes a "content public key" (e.g., a first public key certificate) and a "content private key" (e.g., a first private key certificate). In some implementations, the content public key and the content private key may be stored by content provider device 250.

In some implementations, during the process of subscribing for a toll-free data service, service control device 235 may generate a second public and private key pair, which may be based on the application identifier. The second public and private key pair may include an "enforcement public key" (e.g., a second public key certificate) and an "enforcement private key" (e.g., a second private key certificate).

In some implementations, the content provider may send a request, using campaign input device 245 (e.g., through a self-service onboarding portal), for an enforcement public key. In some implementations, the content provider may provide the content public key to campaign input device 245. In some implementations, the request may include the application identifier and the content public key. In some implementations, the request may include the campaign identifier.

In some implementations, service control device 235 may save the application identifier, the campaign identifier, the content public key, the enforcement public key, and the enforcement private key as a record in a data structure. In some implementations, a cloud-based or national server (e.g., service control device 235) may transmit and/or push, to a regional enforcement server (e.g., service enforcement device 230), the application identifier, the campaign identifier, the content public key, the enforcement public key, and the enforcement private key. In some implementations, service enforcement device 230 may store, in a toll-free data service application data structure (e.g., a TFDS-APP table), the application identifier, the campaign identifier, the content public key, the enforcement public key, and the enforcement private key. In some implementations, service enforcement device 230 may notify service control device 235 that service enforcement device 230 has saved the application identifier, the campaign identifier, the content public key, the enforcement public key, and the enforcement private key.

In some implementations, service control device 235 may transmit the enforcement public key to campaign input device 245, and the content provider may obtain the enforcement public key from campaign input device 245. The content provider may cause content provider device 250 to store the application identifier, the campaign identifier, and the enforcement public key. The content public key and content private key may, in some implementations, already be stored by content provider device 250.

As further shown in FIG. 4A, process 400 may include receiving, from a mobile device, via a service enforcement device, a toll-free data service authorization request, including the application identifier, the campaign identifier, and a session identifier (block 404). For example, content provider device 250 may receive, from mobile device 205, a request for a toll-free data service authorization including the application identifier for the toll-free data service, the campaign identifier for the toll-free data service, and a session identifier (e.g., a random or unique number identifying the request received from the mobile device 205, an identifier associated with the request received from the mobile device 205, etc.). In some implementations, the toll-free data service authorization request may be sent to content provider device 250 by mobile device 205, and routed via base station 210, SGW 220, PGW 225, service enforcement device 230, PGW 225, and/or network 255.

In some implementations, mobile device 205 may also send, to service enforcement device 230, a mobile device number (MDN) for mobile device 205 and/or a mobile device IP address for mobile device 205. In some implementations, mobile device 205 may send the MDN and/or mobile device IP address for mobile device 205 when mobile device 205 attaches to a network (e.g., to the LTE network). In some implementations, mobile device 205 may send the MDN and/or mobile device IP address for mobile device 205 when mobile device 205 sends, to content provider device 250, the request for toll-free data service authorization.

In some implementations, a third party mobile application (e.g., a mobile app associated with the content provider and/or the toll-free data service), which may be installed on mobile device 205, may establish an IP session between the third party mobile app and PGW 225, and PGW 225 may send an MDN-IP session record (e.g., which includes the MDN and/or the mobile device IP address) to the service enforcement device 230.

As further shown in FIG. 4A, process 400 may include determining whether the application identifier and the campaign identifier are valid (block 406). For example, content provider device 250 may attempt to validate the application identifier and/or the campaign identifier that were received from mobile device 205.

In some implementations, content provider device 250 may compare the application identifier received from mobile device 205 to an application identifier stored by content provider device 250. For example, content provider device 250 may determine that the application identifier received from mobile device 205 is valid if the application identifier received from mobile device 205 corresponds to an application identifier stored by content provider device 250.

In some implementations, content provider device 250 may compare the campaign identifier received from mobile device 205 to a campaign identifier stored by content provider device 250. Content provider device 250 may determine that the campaign identifier received from mobile device 205 is valid if the campaign identifier received from mobile device 205 corresponds to a campaign identifier stored by content provider device 250.

In some implementations, content provider device 250 may combine the application identifier and the campaign identifier and apply a hashing algorithm to a result of the combination to form a hash value. Content provider device 250 may compare the hash value to hash values stored by content provider device 250 to determine whether the combination of the application identifier and the campaign identifier is valid. The hash values stored by content provider device 250 may have been previously generated and stored based on lists of valid application identifiers and corresponding campaign identifiers.

As further shown in FIG. 4A, if the application identifier and campaign identifier are not valid (block 406—NO), process 400 may include notifying the mobile device (block 408). For example, if content provider device 250 is unable to validate the application identifier and/or the campaign identifier (e.g., because the application identifier and/or the campaign identifier are not found or are not associated with a valid and/or ongoing toll-free data service campaign, etc.), content provider device 250 may, for example, send, and/or cause to be sent, an appropriate notification to mobile device 205 (e.g., notifying mobile device 205 that the application identifier is not valid, that the campaign identifier is not valid, that the requested toll-free data service is unavailable to mobile device 205, etc.). In some implementations, content provider device 250 may notify mobile device 205 that the requested data service may be available, but not as a toll-free data service (e.g., that mobile device 205 would need to pay for the data service). In some implementations, content provider device 250 may notify mobile device 205 that the requested toll-free data service may be unavailable to mobile device 205 because content provider device 250 is able to validate one of the application identifier and the campaign identifier, but not both. In some implementations, toll-free data service may be available to mobile device 205, even when content provider device 250 is able to validate only one of the application identifier or the campaign identifier.

As further shown in FIG. 4A, if application identifier and campaign identifier are valid (block 406—YES), process 400 may include encrypting, using the enforcement public key, authorization information to generate encrypted authorization information (block 410). For example, if the application identifier and campaign identifier are both valid, content provider device 250 may use the enforcement public key (e.g., the public key that the content provider obtained through campaign input device 245) to encrypt authorization information to generate encrypted authorization information.

In some implementations, the authorization information may include the application identifier, the campaign identifier, a mobile device IP address, a content IP address, a content port identifier, and an expiry time. In some implementations, the authorization information may include at least one first identifier (e.g., the application identifier and/or the campaign identifier) and/or at least one second identifier (e.g., the mobile device IP address, the content IP address, and/or the content port identifier). In some implementations, the mobile device IP address may be or include the IP address where the toll-free data service content may be delivered (e.g., the IP address for mobile device 205). In some implementations, the content IP address may be or include the IP address of the server from which mobile device 205 may receive the toll-free data service content (e.g., content provider device 250 for the toll-free data service content provided to mobile device 205). In some implementations, the content port identifier may correspond to the port from which mobile device 205 may receive the toll-free data service content (e.g., a port associated with content provider device 250 for the toll-free data service content provided to mobile device 205). In some implementations, the expiry time may be or include a duration (e.g., a time period for which a toll-free data service session extends) or an end time (e.g., a time and/or date after which the toll-free data service session is no longer valid), which may be used by and/or for a toll-fee data service session timer (e.g., by a mobile app associated with the toll-free data service, service enforcement device 230, and/or content provider device 250). In some implementations, the authorization information may omit one or more of the listed items of authorization information and/or may include additional items of information.

As further shown in FIG. 4A, process 400 may include encrypting, using a content private key, the session identifier and the encrypted authorization information to generate encrypted session information (block 412). For example, content provider device 250 may use the content private key (e.g., the content provider's private key that corresponds to the content provider's public key (e.g., content public key), which the content provider provided to campaign input device 245) to encrypt the session identifier and the encrypted authorization information to generate encrypted session information.

As further shown in FIG. 4A, process 400 may include sending, to the mobile device, the encrypted session information (block 414). For example, content provider device 250 may send, to mobile device 205, via service enforcement device 230, the encrypted session information.

As further shown in FIG. 4A, process 400 may include receiving, from the content provider device, the encrypted session information (block 416). For example, mobile device 205 may receive, from content provider device 250, via service enforcement device 230, the encrypted session information.

As further shown in FIG. 4A, process 400 may include sending, to the service enforcement device, the encrypted session information, an unencrypted copy of the session identifier, and an unencrypted copy of the application identifier (block 418). For example, mobile device 205 may send, to service enforcement device 230, the encrypted session information received from content provider device 250, along with an unencrypted copy of the session identifier and an unencrypted copy of the application identifier.

As shown in FIG. 4B, process 400 may include receiving, from the mobile device, the encrypted session information, the unencrypted copy of the session identifier, and the unencrypted copy of the application identifier (block 420). For example, service enforcement device 230 may receive, from mobile device 205, the encrypted session information received, by mobile device 205, from content provider device 250, the unencrypted copy of the session identifier, and the unencrypted copy of the application identifier.

In some implementations, service enforcement device 230 may also receive, from mobile device 205, the MDN and/or mobile device IP address for mobile device 205. In some implementations, service enforcement device 230 may receive, from PGW 225, an MDN-IP session record for mobile device 205. In some implementations, service enforcement device 230 may receive the MDN and/or mobile device IP address for mobile device 205 when mobile device 205 attaches to a network (e.g., to the LTE network). In some implementations, service enforcement device 230 may receive the MDN and/or mobile device IP address for mobile device 205 when mobile device 205 sends, to content provider device 250, the request for toll-free data service authorization. In some implementations, service enforcement device 230 may store the MDN and/or the mobile device IP address for mobile device 205.

As further shown in FIG. 4B, process 400 may include determining whether the application identifier is in the toll-free data service application data structure (block 422). For example, service enforcement device 230 may determine whether the unencrypted copy of the application identifier, received from mobile device 205, corresponds to an application identifier stored in the toll-free data service application data structure.

As further shown in FIG. 4B, if the application identifier is not in the toll-free data service application data structure (block 422—NO), process 400 may include notifying the mobile device (block 424). For example, if service enforcement device 230 is unable to match the unencrypted copy of the application identifier to an application identifier stored in the toll-free data service application data structure, service enforcement device 230 may send, and/or cause to be sent, an appropriate notification to mobile device 205 (e.g., notifying mobile device 205 that the requested toll-free data service is unavailable to mobile device 205, that mobile device 205 would need to pay for the data service, etc.). In some implementations, the notification may indicate that the unencrypted copy of the application identifier is not found, is invalid, refers to a toll-free data service campaign that has ended or is unavailable, etc.

As further shown in FIG. 4B, if application identifier is in the toll-free data service application data structure (block 422—YES), process 400 may include obtaining an enforcement private key, a campaign identifier, and a content public key (block 426). For example, if service enforcement device 230 determines that the unencrypted copy of the application identifier corresponds to an application identifier stored in the toll-free data service application data structure, service enforcement device 230 may obtain, from the toll-free data service application data structure, the campaign identifier, the enforcement private key, and the content public key.

As further shown in FIG. 4B, process 400 may include decrypting, using the content public key, the encrypted session information to obtain a decrypted copy of the session identifier and the encrypted authorization information (block 428). For example, service enforcement device 230 may decrypt, using a first public key (e.g., the content public key), the encrypted session information (e.g., the session information that content provider device 250 encrypted using the content private key, as discussed above with reference to block 412) to obtain decrypted session information. Service enforcement device 230 may obtain, from the decrypted session information, a decrypted copy of the session identifier, along with the encrypted authorization information (e.g., the authorization information encrypted by content provider device 250, as discussed above with reference to block 410).

In some implementations, using the content public key, received from the content provider, to decrypt the encrypted session information may also permit service enforcement device 230 to verify that the encrypted session information (e.g., the session information that content provider device 250 encrypted using the content private key, as discussed above with reference to block 412), including the decrypted copy of the session identifier, originated with the content provider (e.g., from content provider device 250). In some implementations, service enforcement device 230 may determine that the encrypted session information originated from the content provider based on the encrypted session information having been encrypted by content provider device 250 using the content private key (e.g., the content provider's private key).

As further shown in FIG. 4B, process 400 may include determining whether the unencrypted copy of the session identifier corresponds to the decrypted copy of the session identifier (block 430). For example, service enforcement device 230 may determine whether the unencrypted copy of the session identifier, received by service enforcement device 230, from mobile device 205, as discussed above with reference to block 420, corresponds to the decrypted copy of the session identifier obtained, by service enforcement device 230, by decrypting the encrypted session information, as discussed above with reference to block 428. Determining whether the unencrypted copy of the session identifier corresponds to the decrypted copy of the session identifier may permit service enforcement device 230 to verify that a session identifier received from mobile device 205 (e.g., the unencrypted copy of the session identifier) corresponds to a session identifier received from a content provider (e.g., the decrypted copy of the session identifier obtained by decrypting the encrypted session information).

As further shown in FIG. 4B, if the unencrypted copy of the session identifier does not correspond to the decrypted copy of the session identifier (block 430—NO), process 400 may include notifying the mobile device (block 424). For example, if the unencrypted copy of the session identifier does not correspond to the decrypted copy of the session identifier, service enforcement device 230 may send, and/or cause to be sent, an appropriate notification to mobile device 205 (e.g., notifying mobile device 205 that the requested toll-free data service is unavailable to mobile device 205, that mobile device 205 would need to pay for the data service, etc.). In some implementations, the notification to mobile device 205 may indicate that the unencrypted copy of the session identifier is invalid or does not correspond to the session identifier that content provider device 250 received from mobile device 205 with the request for a toll-free data service authorization, as discussed above with reference to block 404.

As further shown in FIG. 4B, if the unencrypted copy of the session identifier corresponds to the decrypted copy of the session identifier (block 430—YES), process 400 may include decrypting, using the enforcement private key, the encrypted authorization information to obtain decrypted authorization information, including a decrypted copy of the application identifier and a decrypted copy of the campaign identifier (block 432). For example, if the unencrypted copy of the session identifier corresponds to the decrypted copy of the session identifier, service enforcement device 230 may decrypt, using a second private key (e.g., the enforcement private key), the encrypted authorization information (e.g., the authorization information that content provider device 250 encrypted using the enforcement public key, as discussed above with reference to block 410) to obtain decrypted authorization information. Service enforcement device 230 may obtain, from the decrypted authorization information, a decrypted application identifier and a decrypted campaign identifier.

In some implementations, the decrypted authorization information may include at least one first identifier (e.g., a decrypted copy of the application identifier and/or a decrypted copy of the campaign identifier) and/or at least one second identifier (e.g., a mobile device IP address, a content IP address, a content port identifier, etc.). In some implementations, the decrypted authorization information may include an expiry time for a session of the toll-free data service campaign.

In some implementations, using the enforcement private key to decrypt the encrypted authorization information may also permit the service enforcement device 230 to verify that the encrypted authorization information (e.g., the authorization information that content provider device 250 encrypted using the enforcement public key, as discussed above with reference to block 410) originated with the content provider (e.g., from content provider device 250).

As further shown in FIG. 4B, process 400 may include determining whether the application identifier and the campaign identifier are valid (block 434). For example, service enforcement device 230 may validate the application identifier received from mobile device 205 (e.g., the unencrypted copy of the application identifier received by service enforcement device 230, as discussed above with reference to block 420) and the campaign identifier received from content provider device 250 (e.g., the campaign identifier included in the decrypted authorization information). In some implementations, service enforcement device 230 may validate the application identifier by determining that the unencrypted copy of the application identifier received by service enforcement device 230 corresponds to the decrypted application identifier obtained from the decrypted authorization information. In some implementations, service enforcement device 230 may validate the campaign identifier by determining that the campaign identifier received from content provider device 250 (e.g., the campaign identifier included in the decrypted authorization information) corresponds to the campaign identifier stored in the toll-free data service application data structure.

As further shown in FIG. 4B, if the application identifier and campaign identifier are not valid (block 434—NO), process 400 may include notifying the mobile device (block 424). For example, if service enforcement device 230 determines that the application identifier and/or the campaign identifier are not valid, service enforcement device 230 may send, and/or cause to be sent, an appropriate notification to mobile device 205 (e.g., notifying mobile device 205 that the application identifier is not valid, that the campaign identifier is not valid, that the requested toll-free data service is unavailable to mobile device 205, etc.). In some implementations, service enforcement device 230 may notify mobile device 205 that the requested data service may be available, but not as a toll-free data service (e.g., that mobile device 205 would need to pay for the data service). In some implementations, service enforcement device 230 may notify mobile device 205 that the requested toll-free data service may be unavailable to mobile device 205 because service enforcement device 230 is able to validate one of the application identifier and the campaign identifier, but not both. In some implementations, toll-free data service may be available to mobile device 205, even when service enforcement device 230 is able to validate only one of the application identifier or the campaign identifier.

As further shown in FIG. 4B, if the application identifier and campaign identifier are valid (block 434—YES), process 400 may include determining whether it is past the expiry time (block 436). For example, if service enforcement device 230 determines that the application identifier and the campaign identifier are both valid, service enforcement device 230 may determine whether the expiry time (e.g., the decrypted expiry time from the decrypted authorization information) for the session has passed (e.g., the session duration has been reached or the end time for the session has already occurred).

As further shown in FIG. 4B, if it is past the expiry time (block 436—YES), process 400 may include notifying the mobile device (block 424). For example, if service enforcement device 230 determines that the expiry time for the session has passed, service enforcement device 230 may send, and/or cause to be sent, an appropriate notification to mobile device 205 (e.g., notifying mobile device 205 that the toll-free data service session has ended, that the requested toll-free data service is unavailable to mobile device 205, that mobile device 205 would need to pay for the data service, etc.).

As further shown in FIG. 4B, if it is not past the expiry time (block 436—NO), process 400 may include setting a traffic detection rule based on the campaign identifier, the mobile device IP address, the content IP address, the content port identifier, and/or the expiry time (block 438). For example, if the expiry time for the session has not passed, service enforcement device 230 may set traffic detection rules based on the campaign identifier, the mobile device IP address, the content IP address, the content port identifier, and/or the expiry time that were obtained from the decrypted authorization information. By setting the traffic detection rules based on the campaign identifier, the mobile device IP address, the content IP address, the content port identifier, and/or the expiry time that were obtained from the decrypted authorization information, service enforcement device 230 may set the traffic detection rules based on information (e.g., the authorization information) that content provider device 250 may use to designate traffic as being associated with a content provider's toll-free data service campaign.

In some implementations, service enforcement device 230 may use the traffic detection rules to determine whether traffic is part of a toll-free data service campaign. For example, service enforcement device 230 may determine that traffic (e.g., one or more packets) is part of a toll-free data service campaign (e.g., a toll-free data service campaign that corresponds to a campaign identifier included in traffic detection rules) when the traffic satisfies the traffic detection rules. In some implementations, service enforcement device 230 may determine that traffic satisfies the traffic detection rules if an expiry time in the traffic detection rules has not passed (e.g., the toll-free data service session has not ended) and the traffic includes at least one identifier (e.g., the mobile device IP address, the content IP address, and/or the content port identifier) that satisfies the traffic detection rules (e.g., matches the mobile device IP address, the content IP address, and/or the content port identifier in the traffic detection rules).

In some implementations, traffic detection rules based on the mobile device IP address, the content IP address, the content port identifier, and/or the expiry time may permit a content provider to designate traffic as being associated with multiple toll-free data service campaigns, even when the traffic associated with the multiple toll-free data service campaigns is delivered through the same content IP address and/or from the same content port. For example, traffic associated with multiple toll-free data service campaigns may be distinguished based on the mobile device IP address and/or the session expiry time, even when the traffic associated with the multiple toll-free data service campaigns has the same content IP address and the same content port identifier. In some implementations, distinguishing traffic associated with multiple toll-free data service campaigns, based on the mobile device IP address and/or the session expiry time, may permit a content provider to target a toll-free data service campaign, including multiple toll-free data service campaigns delivered through a single content IP address and a single content port, to particular mobile device IP addresses.

As further shown in FIG. 4B, process 400 may include allowing, as toll-free data service traffic for the mobile device, traffic that satisfies the traffic detection rule (block 440). For example, if service enforcement device 230 determines that the mobile device IP address, the content IP address, and/or the content port identifier for traffic (e.g., for packets in the traffic) satisfy the traffic detection rules, service enforcement device 230 may allow the traffic, for mobile device 205, as toll-free data service traffic associated with the toll-free data service campaign. In some implementations, allowing traffic that satisfies the traffic detection rule, as toll-free data service traffic for mobile device 205, may include creating a traffic flow (e.g., a Transmission Control Protocol (TCP) flow), for the MDN corresponding to mobile device 205, for the traffic that satisfies the traffic detection rule.

In some implementations, service enforcement device 230 may determine whether the campaign is within a valid time range for the content provider's toll-free data service campaign, and tear down the traffic flow if the campaign is not within a valid time range (e.g., the campaign time period has already ended, has not started, has been interrupted, etc.).

In some implementations, service enforcement device 230 may determine whether any toll-free data service quota is available. If not, service enforcement device 230 may request quota from a quota manager and may also update the quota manager with quota already consumed for the campaign. In some implementations, service enforcement device 230 may reserve quota and update usage for the campaign with service control device 235. When quota is available, service enforcement device 230 may count toll-free data service data usage for the MDN. In some implementations, service enforcement device 230 may report toll-free data service data usage for the MDN and the content provider's toll-free data service data campaign to a billing server (e.g., to AAA 240), and the network operator may charge the data usage for the MDN and the content provider's toll-free data service data campaign to the content provider.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Implementations described herein may allow content providers to designate traffic as being associated with a particular toll-free data service campaign (e.g., a toll-free data service campaign set up by the content provider), even where traffic associated with multiple toll-free data service campaigns is delivered through the same IP address and/or from the same port. Allowing content providers to designate traffic as being associated with a particular toll-free data service campaign may permit a network operator to charge data usage to a particular toll-free data service campaign, even where traffic associated with multiple toll-free data service campaigns is delivered through the same IP address and/or from the same port. In some implementations, twice encrypting information exchanged between the content provider and the network operator (e.g., using two sets of public and private key pairs) may permit the content provider or the network operator to verify that received information originated from the other of the content provider and the network operator. In some implementations, the multiple validations (e.g., of the application identifier, the session identifier, and the campaign identifier) may reduce delays related to toll-free data service processing and may reduce traffic load imposed on the network by traffic rules because a traffic flow may not be established for all sessions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device for service enforcement, comprising:
a memory storing instructions; and
one or more processors to execute the instructions to:
receive, from a mobile device, encrypted session information and at least one unencrypted identifier,
the encrypted session information having been encrypted, by a content provider device, using a first private key associated with the content provider device;
decrypt, using a first public key corresponding to the first private key, the encrypted session information to obtain session information,
the session information including encrypted authorization information, and
the encrypted authorization information having been encrypted, by the content provider device, using a second public key associated with another device;
decrypt, using a second private key corresponding to the second public key, the encrypted authorization information to obtain authorization information,
the authorization information including at least one first identifier and at least one second identifier corresponding to a toll-free data service campaign provided by a content provider associated with the content provider device,
the at least one first identifier being different from the at least one second identifier corresponding to the toll-free data service campaign; and
selectively allow traffic, for the mobile device, as toll-free data service traffic associated with the toll-free data service campaign, based on whether the at least one first identifier corresponds to the at least one unencrypted identifier, and based on whether the traffic includes at least one third identifier that corresponds to the at least one second identifier corresponding to the toll-free data service campaign.

2. The device of claim 1, where the one or more processors are further to:
determine whether the at least one unencrypted identifier corresponds to a stored identifier; and
where the one or more processors, when decrypting, using the first public key corresponding to the first private key, the encrypted session information to obtain the session information, are to:
decrypt, using the first public key corresponding to the first private key, the encrypted session information to obtain the session information when the at least one unencrypted identifier corresponds to the stored identifier.

3. The device of claim 1, where the at least one unencrypted identifier includes an application identifier for an application stored by the mobile device,
the application corresponding to the toll-free data service campaign.

4. The device of claim 1, where the at least one unencrypted identifier includes an unencrypted session identifier;
where the session information includes a decrypted session identifier; and
where the one or more processors, when decrypting, using the second private key corresponding to the second public key, the encrypted authorization information to obtain the authorization information, are to:
decrypt, using the second private key corresponding to the second public key, the encrypted authorization information to obtain the authorization information when the decrypted session identifier corresponds to the unencrypted session identifier.

5. The device of claim 1, where the authorization information includes an expiry time for a session of the toll-free data service campaign;
where the one or more processors are further to:
determine whether the expiry time has passed; and
where the one or more processors, when selectively allowing the traffic, for the mobile device, as the toll-free data service traffic, are to:
allow the traffic, for the mobile device, as the toll-free data service traffic, when the expiry time has not passed.

6. The device of claim 1, where the one or more processors are further to:
receive, from the content provider device, the encrypted session information; and
send, to the mobile device, the encrypted session information.

7. The device of claim 1, where the at least one second identifier corresponding to the toll-free data service campaign includes at least one of a mobile device internet protocol (IP) address, a content IP address, or a content port identifier;
where the one or more processors are further to:
set at least one traffic detection rule based on at least one of the mobile device IP address, the content IP address, or the content port identifier; and
where the traffic includes the at least one third identifier that corresponds to the at least one second identifier corresponding to the toll-free data service campaign when the traffic satisfies the at least one traffic detection rule.

8. A non-transitory computer-readable medium storing instructions, the instructions comprising:
one or more instructions that, when executed by one or more processors of a device for service enforcement, cause the one or more processors to:
receive, from a mobile device, encrypted session information and at least one unencrypted identifier,
the encrypted session information having been encrypted, by a content provider device, using a first private key associated with the content provider device;
decrypt, using a first public key corresponding to the first private key, the first encrypted session information to obtain session information,
the session information including encrypted authorization information, and
the encrypted authorization information having been encrypted, by the content provider device, using a second public key associated with another device;
decrypt, using a second private key corresponding to the second public key, the encrypted authorization information to obtain authorization information,
the authorization information including at least one first identifier and at least one second identifier corresponding to a toll-free data service campaign provided by a content provider associated with the content provider device,
the at least one first identifier being different from the at least one second identifier corresponding to the toll-free data service campaign; and
selectively associate traffic, for the mobile device, with the toll-free data service campaign based on whether the at least one unencrypted identifier matches the at least one first identifier and based on whether the traffic satisfies a traffic detection rule set based on the at least one second identifier corresponding to the toll-free data service campaign.

9. The non-transitory computer-readable medium of claim 8, where the one or more instructions, when executed by the one or more processors, further cause the one or more processors to:
determine whether the at least one unencrypted identifier matches a stored identifier; and
where the one or more instructions, that cause the one or more processors to decrypt, using the first public key corresponding to the first private key, the encrypted session information to obtain the session information, cause the one or more processors to:
decrypt, using the first public key corresponding to the first private key, the encrypted session to obtain the session information when the at least one unencrypted identifier matches the stored identifier.

10. The non-transitory computer-readable medium of claim 8, where the at least one unencrypted identifier includes an application identifier for an application stored by the mobile device, the application corresponding to the toll-free data service campaign.

11. The non-transitory computer-readable medium of claim 8,
where the at least one unencrypted identifier includes an unencrypted session identifier;
where the session information includes a decrypted session identifier; and
where the one or more instructions, that cause the one or more processors to decrypt, using the second private key corresponding to the second public key, the encrypted authorization information to obtain the authorization information, cause the one or more processors to:
decrypt, using the second private key corresponding to the second public key, the encrypted authorization information to obtain the authorization information when the decrypted session identifier matches the unencrypted session identifier.

12. The non-transitory computer-readable medium of claim 8,
where the authorization information includes an expiry time for a session of the toll-free data service campaign;

where the one or more instructions, when executed by the one or more processors, further cause the one or more processors to:
  determine whether the expiry time has passed; and
where the one or more instructions, that cause the one or more processors to selectively associate the traffic with the toll-free data service campaign, cause the one or more processors to:
  associate the traffic with the toll-free data service campaign when the expiry time has not passed.

13. The non-transitory computer-readable medium of claim 8, where the one or more instructions, when executed by the one or more processors, further cause the one or more processors to:
  receive, from the content provider device, the encrypted session information; and
  send, to the mobile device, the encrypted session information.

14. The non-transitory computer-readable medium of claim 8, where the at least one second identifier corresponding to the toll-free data service campaign includes at least one of a mobile device internet protocol (IP) address, a content IP address, or a content port identifier.

15. A method, comprising:
  receiving, by a device for service enforcement and from a mobile device, first encrypted session information and an unencrypted first identifier,
    the encrypted session information having been encrypted, by a content provider device, using a first private key associated with the content provider device;
  decrypting, by the device and using a first public key corresponding to the first private key, the encrypted session information to obtain session information,
    the session information including encrypted authorization information, and
    the encrypted authorization information having been encrypted, by the content provider device, using a second public key associated with another device;
  decrypting, by the device and using a second private key corresponding to the second public key, the encrypted authorization information to obtain authorization information,
    the authorization information including a decrypted first identifier and a second identifier corresponding to a toll-free data service campaign provided by a content provider associated with the content provider device,
      the decrypted first identifier being different from the second identifier corresponding to the toll-free data service campaign;
  determining, by the device, whether the unencrypted first identifier matches the decrypted first identifier;
  determining, by the device, whether traffic, for the mobile device, includes at least one third identifier that matches the second identifier corresponding to the toll-free data service campaign; and
  associating, by the device, the traffic with the toll-free data service campaign, when:
    the unencrypted first identifier matches the decrypted first identifier, and
    the third identifier matches the second identifier corresponding to the toll-free data service campaign.

16. The method of claim 15, where decrypting, using the first public key corresponding to the first private key, the encrypted session information to obtain the session information comprises:
  decrypting, using the first public key corresponding to the first private key, the encrypted session information to obtain the session information when the unencrypted first identifier matches a stored first identifier.

17. The method of claim 15, where the unencrypted first identifier includes an unencrypted session identifier;
  where the session information includes a decrypted session identifier; and
  where decrypting, using the second private key corresponding to the second public key, the encrypted authorization information to obtain the authorization information comprises:
    decrypting, using the second private key corresponding to the second public key, the encrypted authorization information to obtain the authorization information when the decrypted session identifier corresponds to the unencrypted session identifier.

18. The method of claim 15, where the authorization information includes an expiry time for a session of the toll-free data service campaign;
  where the method further comprises:
    determining whether the expiry time has passed; and
  where associating the traffic with the toll-free data service campaign comprises:
    associating the traffic with the toll-free data service campaign when the expiry time has not passed.

19. The method of claim 15, where the method further comprises:
  setting at least one traffic detection rule based on the second identifier corresponding to the toll-free data service campaign; and
where determining whether the traffic, for the mobile device, includes the at least one third identifier that matches the second identifier corresponding to the toll-free data service campaign comprises:
  determining whether the traffic, for the mobile device, satisfies the at least one traffic detection rule.

20. The method of claim 15, where the second identifier includes at least one of a mobile device internet protocol (IP) address, a content IP address, or a content port identifier; and
  where the method further comprises:
    receiving the encrypted session information from the content provider device, and
    sending the encrypted session information to the mobile device.

* * * * *